Sept. 23, 1924. 1,509,243
W. S. KUPFER
MELTING FURNACE CAR
Original Filed Dec. 11, 1920 2 Sheets-Sheet 1

INVENTOR
Walter S Kupfer
BY
J E. Hubbell
his ATTORNEY

Sept. 23, 1924.   1,509,243
W. S. KUPFER
MELTING FURNACE CAR
Original Filed Dec. 11, 1920   2 Sheets-Sheet 2
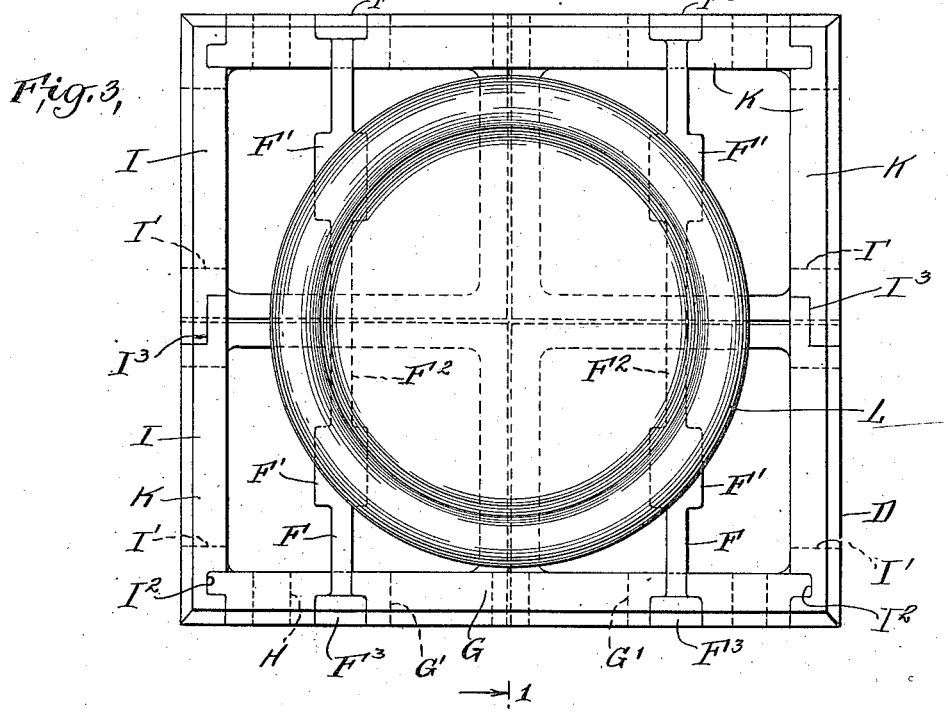
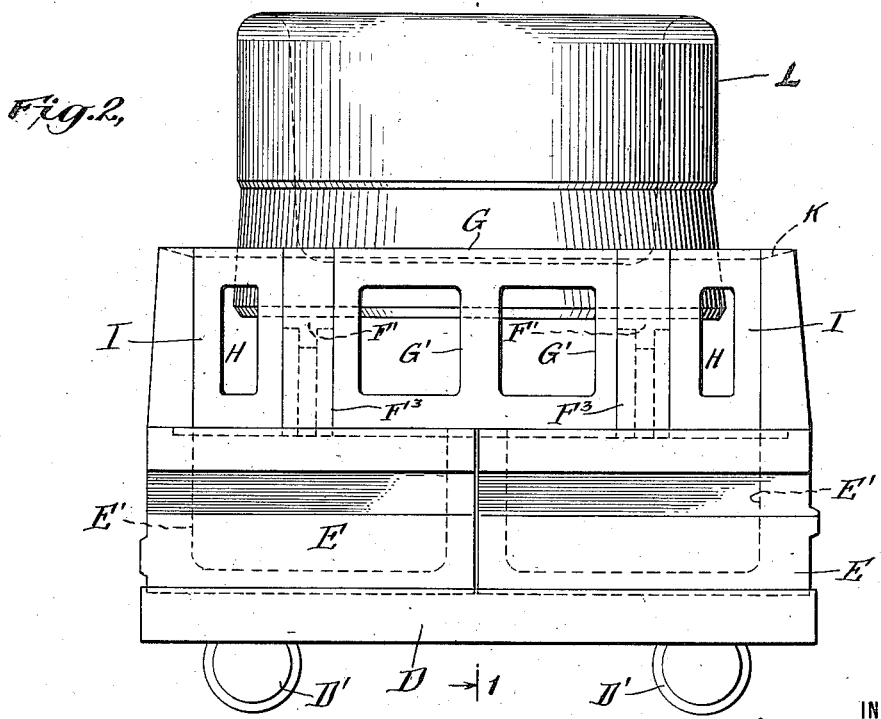
INVENTOR
Walter S Kupfer
BY
J. E. Hubbell
his ATTORNEY Patented Sept. 23, 1924.

1,509,243

UNITED STATES PATENT OFFICE.

WALTER S. KUPFER, OF CLEVELAND, OHIO, ASSIGNOR TO AMERICAN DRESSLER TUNNEL KILNS, INC., OF CLEVELAND, OHIO, A CORPORATION OF NEW YORK.

MELTING-FURNACE CAR.

Application filed December 11, 1920, Serial No. 429,873. Renewed March 17, 1924.

*To all whom it may concern:*

Be it known that I, WALTER S. KUPFER, citizen of the United States, and resident of Cleveland, in the county of Cuyahoga and State of Ohio, have invented certain new and useful Improvements in Melting-Furnace Cars, of which the following is a specification.

My present invention consists in a car of novel construction especially devised and adapted for transporting a melting pot through a glass melting furnace of the continuous tunnel type and the general object of the invention is to provide a simple, durable and effective car for the purpose specified, having provisions for minimizing injurious consequences and annoyance resulting from the spillage of the molten contents of the melting pot or other receptacle for molten material in case the pot or receptacle boils or froths over or breaks while in, or in transit through a furnace. In carrying out my invention I provide a car with a refractory superstructure so shaped and disposed as to form a support for the melting pot or other receptacle permitting the ready and efficient heating of the latter, and provided with one or more pockets or chambers into which the melting pot contents flow and are retained in case the pot boils over or breaks, and preferably also having provisions for holding the pot fragments on the car in case the pot breaks. Preferably also, I form the refractory superstructure of the car in such manner as to facilitate the subsequent removal of the pot fragments and pot contents in case of pot breakage.

The various features of novelty which characterize my invention are pointed out with particularity in the claims annexed to and forming a part of this specification. For a better understanding of the invention, however, the advantages possessed by it and specific objects attained with it, reference should be had to the accompanying drawings and descriptive matter in which I have illustrated and described a preferred embodiment of my invention.

Of the drawings:

Fig. 2 is a side elevation of the car shown in Fig. 1; and

Fig. 3 is a plan view of the car.

Figure 1:
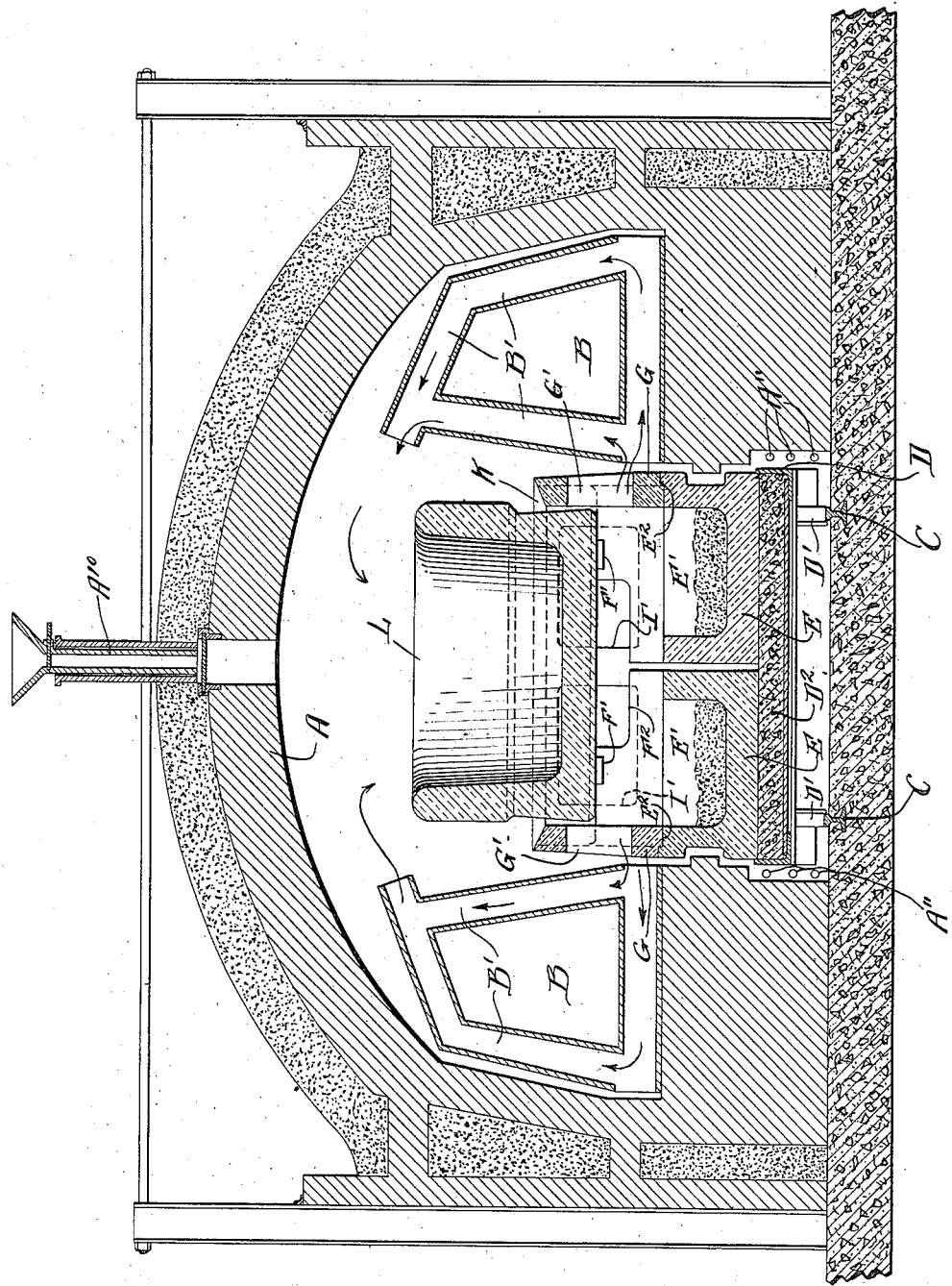
Fig. 1 is a transverse section of a melting furnace of the continuous tunnel type with one of my improved cars therein, the car itself being shown in section on the line 1—1 of Fig. 2.

In the drawings I have shown my improved car construction in connection with a glass melting furnace A which is of the continuous tunnel kiln type and is provided with internally heated combustion chambers or muffles B extending longitudinally of the furnace at the opposite sides of the pathway therethrough for the melting pots L which are carried through the kiln on cars D running on track rails C. The combustion chambers B are shown as formed with open ended circulating passages B' in their walls for maintaining a directed convection current circulation of the kiln atmosphere, as indicated by the arrows in Fig. 1. The combustion chambers are of the type employed in the well known Dressler tunnel kilns. In the kiln shown, provisions indicated at $A^{10}$, are made for charging glass or glass forming mixture into the receptacles L, such provisions being preferably distributed along the length of the kiln as set forth in an application for patent which I am about to file on a glass melting furnace. $A^{11}$ represents the usual cooling pipes provided to prevent overheating of the underportions of the cars D.

The car D in the form shown comprises a metallic bottom frame portion in which are mounted the wheels D' running on the track rails C. Mounted on the metallic framework of the car is a bed or base portion $D^2$, which may advantageously be formed of reinforced concrete, and mounted on the bed portion $D^2$ is the refractory superstructure proper of the car. The refractory superstructure is preferably formed as shown of relatively large blocks of burnt fireclay or analogous refractory material. As shown the lower portion of the car superstructure is formed of four massive blocks E of burnt fireclay or like refractory material each formed with a separate cavity or chamber E' in its upper portion. Mounted on the rims of the chambered members E are girders F which, as shown, extend transversely to the length of the car and are laterally enlarged as indicated at F' to provide seats for the melting pot L. The latter in the preferred construction shown has its lower portion received in a sort of a cage or rack open at its upper end, and formed in the construction illustrated, by outer end portions of the girder members F which project above the seats F' for the pots L, and by blocks or slabs G, H and I of burnt fireclay or analogous refractory material which are mounted on top of the rim portions of the blocks E at the outer margin of the car, and are advantageously interlocked with one another so as to prevent their displacement outwardly in case the pot L breaks apart while at the same time not preventing their removal from the car if and when this becomes necessary to make repairs to the car, or to remove pot fragments and pot contents from the car in case of the breaking of the pot. As shown the girders F are provided with laterally enlarged heads $F^3$ at their outer ends and the blocks G and I are rabetted to fit against the heads $F^3$ and are held by the latter against outward displacement in case the pot L breaks and tends to thrust them out. As shown also the blocks H are formed with vertical ribs adjacent the ends of the car which enter corresponding grooves $I^2$ formed in the blocks I, the latter extending transversely to the end of the car at the ends of the latter. As shown there are two blocks I at each end of the car and these blocks are formed with shoulders which overlap as indicated at $I^3$. At the margin of the car, the rim portions of the blocks E are rabetted at their upper edges, as indicated at $E^2$, to receive shoulders formed on the bottom of the girders F and blocks G, H and I and thereby assist in preventing outward displacement of the parts mounted on the blocks E.

To permit a free circulation of the kiln atmosphere along the under portion of the pot L and to thereby minimize local temperature variations in the pot itself as well as in the refractory superstructure of the car, openings G', H' and I' are formed in the blocks G, H and I, and inner portions of the girders F are cut away at the top as indicated at $F^2$. Advantageously as shown the blocks G, H and I are bevelled off to provide an inward and downwardly inclined surface K at the upper edge of the cage surrounding the pot which directs pot spillage falling on the upper edge of the cage to the interior of the cage and thence into the chambers E'.

It will be apparent to those skilled in the art that the car superstructure shown is relatively simple and inexpensive in construction as well as durable in operation and effective for the purpose for which it is devised. Pot spillage resulting from the breaking of the pot or from its contents frothing, boiling over or being shaken over the top of the pot are directed into the chambers E' and the cage or guard provided about the lower portion of the pot L is obviously effective to retain the pot fragments on the car in case the pot breaks apart as may happen from time to time.

The particular shapes shown of the parts E, F, G, H and I are desirable in that their form facilitates the construction of these parts, and in that a car superstructure built up of parts so shaped is strong and durable and comprises joints sufficiently numerous and so disposed as to minimize objectionable expansion and contraction cracks, but those skilled in the art will understand that such advantages can be obtained with car superstructure parts differing in shape from those shown.

The invention is especially useful in connection with glass melting furnaces of the continuous tunnel type because of the trouble and annoyance resulting from the spillage of the pot contents and from pot fragments falling off the car when the latter is in the interior of a furnace of this type. The invention, however, is obviously not restricted in use to glass melting or in connection with a furnace of any particular type.

While in accordance with the provisions of the statutes I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used without a corresponding use of the other features.

Having now described my invention, what I claim as new and desire to secure by Letters Patent, is:

1. A car of the character specified comprising a refractory superstructure shaped to provide a seat for a melting pot and a chamber beneath said seat adapted to receive and retain pot spillage and having portions projecting above said seat and adapted to hold pot fragments on the car in case of breakage of a pot mounted on said seat.

2. A car of the character specified having a superstructure comprising blocks of refractory material formed with cavities open at their upper sides, pot supporting girders of refractory material extending across said cavities and blocks of refractory material resting on the first mentioned blocks and forming a cage or shell surrounding the lower portion of a pot resting on said girders.

3. A car of the character specified having a superstructure comprising blocks of refractory material formed with cavities open at their upper sides, pot supporting girders of refractory material extending across said cavities and blocks of refractory material resting on the first mentioned blocks and forming a cage or shell surrounding the lower portion of a pot resting on said girders said second mentioned blocks being formed with apertures to facilitate atmospheric circulation along the bottom of said pot.

4. A car of the character specified having a superstructure comprising blocks of refractory ware formed with cavities open at their upper sides, refractory pot supporting girders extending across said cavities, and blocks of refractory material resting on the first mentioned blocks and interlocking from one another and said girders and forming a cage or shell surrounding the lower portion of a melting pot resting on said girders.

Signed at New York in the county of New York and State of New York this 29th day of November A. D. 1920.

WALTER S. KUPFER.